United States Patent [19]
Irvine

[11] 3,981,373
[45] Sept. 21, 1976

[54] UNITARY FRAME AND ENGINE SUPPORT FOR SNOWMOBILE

[75] Inventor: Gerald O. Irvine, Crosby, Minn.

[73] Assignee: Scorpion, Inc., Crosby, Minn.

[22] Filed: May 23, 1975

[21] Appl. No.: 580,299

[52] U.S. Cl. .............................. 180/5 R; 305/27; 180/9.54
[51] Int. Cl.² .................. B62M 27/00; B62D 27/02
[58] Field of Search ............. 180/5 R, 9.24 A, 9.44, 180/9.54, 66.12; 305/27

[56] References Cited
UNITED STATES PATENTS

| | | |
|---|---|---|
| 3,709,312 | 1/1973 | McGough ........................ 180/5 R |
| 3,871,460 | 3/1975 | Dehnert ........................... 180/5 R |

*Primary Examiner*—Philip Goodman
*Attorney, Agent, or Firm*—Dugger, Johnson & Westman

[57] ABSTRACT

A frame construction for snowmobiles which utilizes perimeter frame members for carrying the front cross axle for the front ski spindles. The perimeter frame members are attached to and reinforced with respect to the tunnel that houses the drive track to provide a rigid structure that permits a wide spacing at the front of the tunnel for placing an engine and torque converter in a low position, to aid in lowering the center of gravity of the snowmobile, without complex mounting and frame members.

9 Claims, 4 Drawing Figures

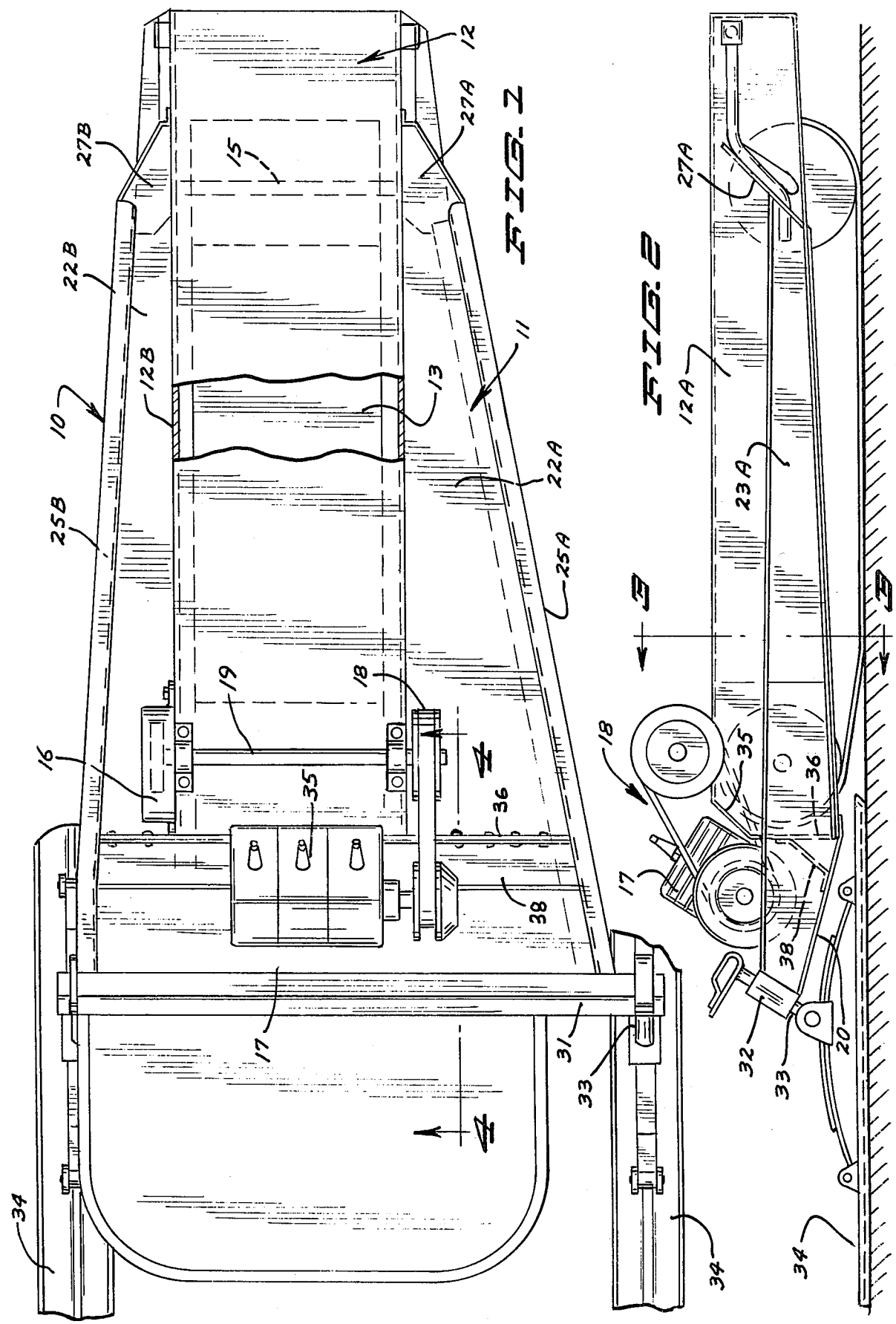

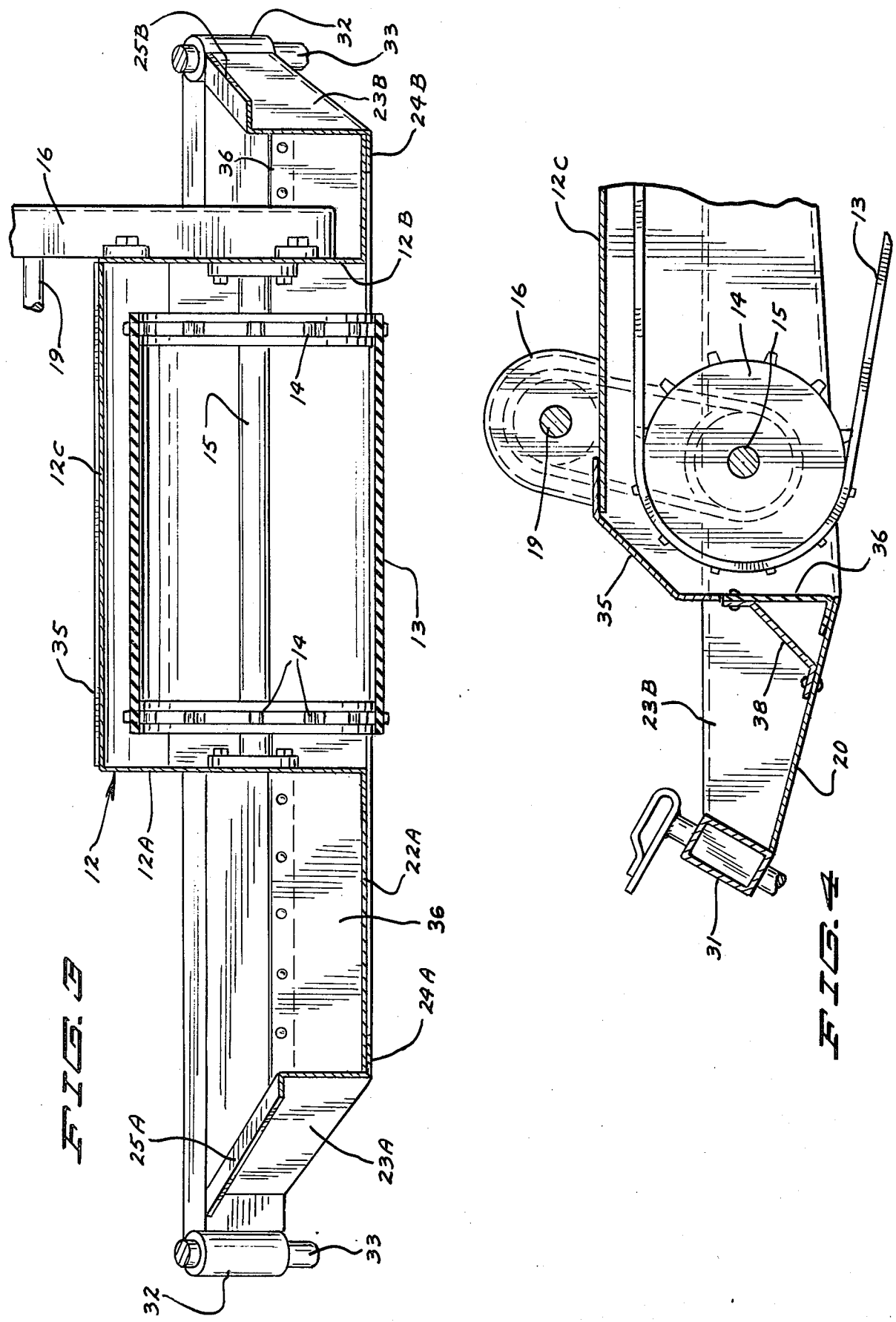

UNITARY FRAME AND ENGINE SUPPORT FOR SNOWMOBILE

BACKGROUND OF THE INVENTION

1. Field of the Invention

The present invention relates to snowmobile chassis or frame construction.

2. Prior Art

In the prior art, it has been common to provide heavy structural members which extend from the front of the tunnel that normally houses the drive track for the snowmobile forwardly to carry the hubs for the ski spindles used for steering the snowmobile and to support the engine. Placing large structural elements immediately ahead of the tunnel results in raising the engine of the snowmobile to clear the structural elements so that the center of gravity of the snowmobile is unnecessarily raised. The basic problem has been in getting enough rigidity in the entire frame of the machine to prevent racking and twisting (torsional weakness) of the snowmobile chassis.

U.S. Pat. No. 3,548,961 shows means for attempting to strengthen the tunnel of a snowmobile for obtaining torsional rigidity and lowering the stress in some of the frame members to prevent failure of the frame.

However, again, the structure at the front portions of the tunnel is conventional in this patent.

U.S. Pat. No. 3,709,312 also shows a snowmobile construction which has a front pan or housing for an engine, but does not disclose the means for supporting the skis with respect to the chassis of the snowmobile. At first glance, the structure of U.S. Pat. No. 3,709,312 would resemble the present device, but no means for structurally reinforcing the perimeter members is in U.S. Pat. No. 3,709,212 and there is no suggestion that such structural rigidity is a problem. It is believed that the showing is merely schematic in U.S. Pat. No. 3,709,312.

It has been known to extend front ski supports directly from the side walls of the tunnel, and to use side panels such as those in U.S. Pat. No. 3,871,460 but again this is a narrow spacing without adequate room for nesting an engine in between the structural members for the ski supports. In U.S. Pat. No. 3,871,460 drive shafts and the like must extend through front frame panels to achieve lowering of the engine.

SUMMARY OF THE INVENTION

The present invention relates to a snowmobile frame which provides adequate structural support while at the same time permitting the lowering of the engine and drive components relative to the tunnel of the frame.

In the form of the invention shown, a pair of spaced perimeter carrying members are provided adjacent the outer edges of the running board or foot boards of the normal snowmobile chassis, and these perimeter members are structurally reinforced back to the tunnel. At the forward end of the frame, the spaced perimeter frame members are sufficiently far apart so that an engine and torque converter may be placed between them so that the engine is lowered down onto the nose pan of the snowmobile. The front steering skis are supported on the cross axle ahead of the engine and are adequately supported back to the tunnel through the perimeter frame members and the structural reinforcing members. In this manner, the perimeter frame gives adequate structural stability, good rigidity in torsion, and insures that the frame has adequate strength at the ski supports.

The ability to lower the engine center of gravity lowers the center of gravity of the machine and makes it more stable, as well as permitting the lowering of the sillouette of the machine at the forward portion for streamlining purposes.

In the form shown, the front axle for carrying the steering skis is shown shifted from center on the machine, but it is to be understood that the front axle position can be in any desired location.

Thus, the invention encompasses the concept of having at least one perimeter frame member in connection with other supports to permit an engine to be placed therebetween, without any substantial amount of structure directly ahead of the tunnel of a snowmobile chassis, and structurally supporting the perimeter frame member with respect to the tunnel without interfering with the space ahead of the tunnel.

BRIEF DESCRIPTION OF THE DRAWINGS

FIG. 1 is a top plan view of a typical snowmobile chassis made according to the present invention;

FIG. 2 is a side elevational view of the device of FIG. 1 showing an engine schematically in position;

FIG. 3 is a sectional view taken as on line 3—3 in FIG. 2; and

FIG. 4 is a sectional view taken as on line 4—4 in FIG. 1.

DESCRIPTION OF THE PREFERRED EMBODIMENTS

A snowmobile chassis indicated generally and part schematically at 10 includes a main frame member 11 which has a central tunnel 12 formed in the usual manner. Referring to FIG. 3, the tunnel is an inverted U shaped, downwardly open member that has a top panel 12C, and vertical side panels 12A and 12B. The side walls 12A and 12B are spaced apart to accommodate a drive track 13 that is mounted within the tunnel in the normal manner. As shown, suitable sprockets indicated generally at 14 are mounted onto shafts 15, and the forward one of these shafts is driven to drive the track to propel the snowmobile over the snow. A drive train including a chain case 16 can be used for driving the forward shaft 15 in a known manner as well. Thus an engine indicated generally at 17 is shown only schematically, but includes an output V belt torque converter 18 that is of suitable design.

The output pulley of the torque converter drives a cross shaft 19. Reference may be made to U.S. Pat. No. 3,776,354 issued Dec. 4, 1973 to Marley J. Duclo et al. for details of a suitable drive arrangement.

In order to keep the engine 17 as low down as possible, it is mounted onto a bottom plate or nose pan 20 ahead of the tunnel 12. This nose pan in the present invention is supported by structural members as will be explained so that it will carry the engine without buckling or bending, and provide adequate structural support not only for the engine but for other forward mounted components as well. As shown, the chassis, as is common, has foot supports or laterally extending panels 22A and 22B, respectively, attached to the side walls 12A and 12B, respectively of the tunnel. These are also conventional and extend laterally outwardly and provide foot supports for snowmobile operators when they sit on the top of the tunnel on a suitable seat which is not shown.

In the present invention, however, upright perimeter frame members indicated at 23A and 23B, respectively, are positioned at the outer edges of the foot supports 22A and 22B, respectively and provide a vertical structural section of substantial depth as shown. A flange 24A or 24B, respectively is used underneath the foot support for attaching thereto, and these flanges can be welded into position or suitably fixedly attached as desired. An upper edge flange 25A or 25B also is provided for side to side rigidity. Thus, the side members 23A and 23B form a "Z" shaped section.

These upright frame members 23A and 23B extend rearwardly substantially to position adjacent the rear shaft 15 for the sprockets for the drive track 13, and terminate with transition brackets 27A and 27B, which are fixed to the upright members 23A and 23B, and extend laterally above the foot support members to be fixedly attached in a suitable manner directly to the side walls 12A and 12B to structurally tie in the vertical frame members 23A and 23B to the side walls 12A and 12B of the tunnel. Transition brackets 27A and 27B may be placed further ahead than shown provided some structural tie is provided between them, such as a shaft or brace running laterally between the walls of the tunnel.

As can be seen, the upright members 23A and 23B extend forwardly of the forward end of the tunnel, and their lower edges are tapered upwardly as shown in FIG. 2 at the forward ends to provide a flange support for the nose pan or plate 20. At the forward end of the upright members 23A and 23B, there is a cross axle 31 that is welded into the ends of both of the upright frame members 23A and 23B, as well as the flanges 24A, 24B and 25A, 25B at the bottom and top thereof. Axle 31 is a rectangular tubular member that ties the vertical perimeter frame members 23A and 23B together at the forward ends for rigidity. The axle 31 also has tubular members or hubs 32 on the opposite ends thereof used for supporting the spindles 33 of the front steering skis 34.

The steering skis are steered in a normal manner through arms that are shown in FIG. 2.

At the forward end of the tunnel, a reinforcing plate 35 is provided to extend down over the front edge of the tunnel. The reinforcing plate aids in providing structural strength for mounting a jack shaft and other drive train members that are shown schematically in FIG. 2 for driving the sprockets on the drive track. Additionally, the lower portion of the front edge of the tunnel is enclosed by a transverse vertical reinforcing plate 36 which ties into the front edge of the foot supports 22A and 22B on each side of the tunnel, and which also is fixed or welded at its opposite ends to the vertical frame members 23A and 23B forming the perimeter frame members. Plate 36 is shown also in FIG. 3. It is shown extending across the top of the foot plates 22A and 22B and is attached to the vertical member 23A and 23B. The cross plate 36 ties the upright perimeter frame members 23A and 23B to the front edge of the tunnel, and forms a rigid structure in combination with the transition plates 27A and 27B and axle 31. For additional support, a transverse gusset plate 38 extends between the vertical frame members 23A and 23B, and also is fastened to the nose pan 20 along one longitudinal edge, and is fastened to upright plate 36 along its other longitudinal edge for reinforcing the nose pan without interfering with the engine position or taking up a substantial amount of room directly ahead of the tunnel. This gusset plate 38 extends rearwardly and upwardly from the nose pan as shown, and is rivted or otherwise fastened to the nose pan 20 and the upright plate 36 in a suitable manner.

The upright perimeter frame members 23A and 23B have sufficient vertical depth to adequately support the snowmobile and provide means for carrying the loads on the front ski spindles back into the tunnel, and also to provide adequate rigidity to prevent excessive torsional twisting. At the same time, the perimeter frame members are spaced apart a sufficient distance to permit the engine and torque converter to be dropped between them so that the engine can be lowered a substantial amount without passing engine shafts through upright frame members.

The controls and drive train for the snowmobile can be the same as in conventional machines, but the perimeter frame, including the front cross axle, which tends to tie the vertical frame members 23A and 23B together, permits the lowering of the center of gravity while retaining adequate strength for supporting the snowmobile and riders without failure.

What is claimed is:

1. A snowmobile frame construction comprising a main housing including a tunnel portion adapted to house and mount a snowmobile drive track including a forward frame comprising a pair of vertical flange means, one on each side of the tunnel portion extending at least partially coextensively with and also forwardly of said tunnel portion and being spaced laterally outwardly from said tunnel portion a sufficient distance to permit an engine and torque converter assembly of the snowmobile to be positioned between said vertical flange means and forwardly of said tunnel portion, a front axle assembly structurally attached to the forward ends of both of said vertical flange means and ahead of a substantial portion of the engine of the snowmobile, and structural reinforcing means between both of said vertical flange means and the forward end of said tunnel portion, said structural reinforcing means including a panel member of substantial vertical depth structurally connected to said vertical flange means to transmit loads from said vertical flange means to said tunnel portion, and means to structurally connect the rearward portions of said vertical flange means to the tunnel portion.

2. The combination as specified in claim 1 wherein said vertical flange means extend rearwardly a substantial distance along the longitudinal length of said tunnel portion.

3. The frame construction of claim 1 wherein there are a pair of vertical flange means, one on each side of said tunnel member, and each vertical flange means being structurally connected to said front axle assembly.

4. The combination as specified in claim 1 and a nose pan extending ahead of said tunnel and being attached to and below both of said vertical flange means, and a gusset member between said nose pan and said panel member.

5. The combination as specified in claim 1 wherein said tunnel includes spaced apart vertical walls, and foot rest means attached to lower portions of said vertical wall of said tunnel portion, said foot rest means comprising laterally extending sections of material, each of said vertical flange means being attached to the outer edge of one of said foot rest means and extending upwardly therefrom.

6. The combination as specified in claim 5 and means to attach steering skis to said front axle assembly.

7. The combination of claim 2 wherein said tunnel portion includes vertical side walls, said vertical flange means aligning with said vertical side walls, said means to structurally connect the rearward portions of said vertical flange means to said tunnel being fixed to said vertical walls.

8. A snowmobile frame construction comprising a main housing including a tunnel portion adapted to house and mount a snowmobile drive track, and including a forward frame comprising a pair of vertical flange means, one on each side of said tunnel portion extending at least partially coextensively with and also forwardly of said tunnel portion and spaced laterally outwardly from said tunnel portion a sufficient distance to permit an engine and torque converter assembly to be positioned between said vertical flange means and forwardly of said tunnel portion, a nose pan extending ahead of said tunnel portion and being attached to and below said vertical flange means, a front axle assembly structurally attached to and extending between said vertical flange means, a structural reinforcing member attached to both of said vertical flange means and positioned ahead of and attached to said tunnel portion, and a gusset member between said nose pan and said structural reinforcing member, said gusset being positioned immediately ahead of said tunnel portion and extending transversely across the machine to both of said vertical flange means.

9. A snowmobile frame construction comprising a main housing including a tunnel portion adapted to house and mount a snowmobile drive track, said tunnel portion having a pair of generally vertical walls, and a frame reinforcing assembly comprising a vertical flange extending in direction along to said vertical wall on at least one side of said tunnel portion and being spaced from the adjacent vertical wall, said vertical flange means extending partially coextensively with and also forwardly of the adjacent vertical wall, a front cross axle assembly attached to the forward end of said vertical flange means and extending laterally across the snowmobile frame and being spaced from the front of the tunnel portion, means to connect the opposite end of said front axle assembly from the vertical flange means to said tunnel portion, said front axle assembly being spaced forwardly of said tunnel portion a sufficient distance to permit an engine to be positioned generally between said front axle and the front of said tunnel portion, and below the level of at least portions of said vertical flange means, a generally vertically extending reinforcing panel attached to both of the vertical walls of said tunnel portion and extending laterally toward the vertical flange means, means to structurally connect said vertical flange means to said reinforcing panel, and means to structurally connect the rearward end of said vertical flange means to the adjacent vertical wall of said tunnel portion.

* * * * *